US006586490B1

(12) United States Patent
Dietrich et al.

(10) Patent No.: US 6,586,490 B1
(45) Date of Patent: Jul. 1, 2003

(54) POLYOL MIXTURE FOR THE PREPARATION OF RIGID POLYURETHANE FOAMS

(75) Inventors: Karl-Werner Dietrich, Odenthal (DE); Torsten Heinemann, Siegburg (DE); Manfred Dietrich, Frankfurt (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/958,714

(22) PCT Filed: Apr. 3, 2000

(86) PCT No.: PCT/EP00/02964

§ 371 (c)(1),
(2), (4) Date: Oct. 10, 2001

(87) PCT Pub. No.: WO00/63276

PCT Pub. Date: Oct. 26, 2000

(30) Foreign Application Priority Data

Apr. 14, 1999 (DE) .......................................... 199 16 647

(51) Int. Cl.$^7$ ................................................ C08G 18/14
(52) U.S. Cl. ............. 521/167; 252/182.26; 252/182.27; 521/170; 521/172; 521/173; 521/174
(58) Field of Search ....................... 252/182.26, 182.27; 521/170, 172, 173, 174, 167

(56) References Cited

U.S. PATENT DOCUMENTS

| 4,209,609 A | * | 6/1980 | Haas ........................... 528/421 |
| 4,421,871 A | | 12/1983 | Korczak et al. ............. 521/167 |
| 5,886,062 A | | 3/1999 | Dietrich et al. ............. 521/167 |

FOREIGN PATENT DOCUMENTS

EP          0 001 800        5/1979

OTHER PUBLICATIONS

*Chemical Abstracts, vol. 109, No. 26, Dec. 26, 1988, Columbus, Ohio UjS; abstract No. 232192m, XP00006083 & JP 63 137917 A (Toyoda Gosei Co. Ltd.) Jun. 9, 1988.

* cited by examiner

*Primary Examiner*—John M. Cooney, Jr.
(74) *Attorney, Agent, or Firm*—Joseph C. Gil; Lyndanne M. Whalen

(57) ABSTRACT

The present invention relates to polyol mixtures which are suitable for the preparation of rigid polyurethane foams and comprise addition products of alkylene oxide on aromatic di- or polyamines, and rigid foams prepared with these polyol mixtures.

16 Claims, No Drawings

POLYOL MIXTURE FOR THE PREPARATION OF RIGID POLYURETHANE FOAMS

BACKGROUND OF THE INVENTION

The present invention relates to polyol mixtures which are suitable for the preparation of rigid polyurethane foams and comprise addition products of alkylene oxide on aromatic di- or polyamines, and rigid foams prepared with these polyol mixtures.

Rigid foam polyether-polyols conventionally have a viscosity of 2,000 to 15,000 mPas at 25° C., and in exceptional cases base polyols with viscosities of up to 40,000 mPas at 25° C. are also found. Polyols with OH numbers of 350 to 500 are conventionally employed. In their preparation, a starter with active hydrogen atoms, e.g. a polyalcohol, such as sucrose or sorbitol, or a primary or secondary polyamine, e.g. ethylenediamine or toluylenediamine, is as a rule reacted with an alkyl oxide, a basic catalyst being co-used. In the case of amines specifically, a procedure is often followed in which in each case one alkylene oxide per NH group is first added on to the amine. The addition of further alkylene oxide then takes place only after the addition of the basic catalyst, e.g. KOH. As a result of this, the overall process becomes complicated and is slowed down. This is particularly pronounced in the case of the PO-polyethers which are of industrial interest and are started on aromatic amines. Such polyethers have a very favourable influence on thermal conductivities, strength, curing and blowing agent (alkane) solubility.

Polyethers based on aromatic amines in which a maximum of one alkylene oxide, preferably predominantly propylene oxide (PO), is added on per NH group can be prepared in a one-stage process. In spite of their easy accessibility and their economic properties, such products hitherto so far had only a low industrial importance, since such products have too high a viscosity or are solid at room temperature.

EP-A 826 708 discloses polyol mixtures which comprise addition products of alkylene oxides on di- or polyamines containing primary or secondary amino groups and castor oil and/or reaction products of the addition products mentioned with castor oil. The addition products have OH numbers of at least 500. In addition, the polyol mixture can also comprise further compounds which have at least two hydrogen atoms which are reactive towards isocyanates and a molecular weight of 200 to 12,500 g/mol, such as polyether-polyols or polyester-polyols.

SUMMARY OF THE INVENTION

It has now been found that addition products of alkylene oxide on primary and secondary di- and polyamines, a maximum of in each case one alkylene oxide molecule being added on per NH group, have outstanding processing properties if they are mixed with other polyether- or polyester-polyols which have OH numbers of 250 to 500. The addition product is mixed here with a low-viscosity polyol before, during or after the preparation. It is particularly surprising that these short-chain aminic polyols already have an unexpectedly favourable influence on curing and therefore on the mould dwell time of the foams even at a low concentration.

DETAILED DESCRIPTION OF THE INVENTION

The invention thus provides polyol mixtures which comprise a) 5 to 60 wt. %, preferably 10 to 30 wt. % of one or more addition product(s) of alkylene oxide on aromatic di- or polyamine, the molar ratio in the addition product of alkylene oxide to hydrogen atoms bonded to nitrogen in the aromatic di- or polyamine being not more than 1:1, and b) 40 to 95 wt. %, preferably 70 to 90 wt. % of polyols with OH numbers of 250 to 500.

Polyols with OH numbers of 250 to 500 which are preferably employed are polyether-polyols (in particular poly(oxyalkylene) polyols) and polyester-polyols.

The polyether-polyols are prepared by known methods, preferably by base-catalysed polyaddition of alkylene oxides on to polyfunctional starter compounds containing active hydrogen atoms, such as e.g. alcohols or amines. Examples which may be mentioned are: ethylene glycol, diethylene glycol, 1,2-propylene glycol, 1,4-butanediol, hexamethylene glycol, bisphenol A, trimethylolpropane, glycerol, pentaerythritol, sorbitol, sucrose, degraded starch, water, methylamine, ethylamine, propylamine, butylamine, aniline, benzylamine, o- and p-toluidine, α,β-naphthylamine, ammonia, ethylenediamine, propylenediamine, 1,4-butylenediamine, 1,2-, 1,3-, 1,4-, 1,5- and/or 1,6-hexamethylenediamine, o-, m- and p-phenylenediamine, 2,4- and 2,6-toluylenediamine, 2,2'-, 2,4- and 4,4'-diaminodiphenylmethane and diethylenediamine.

Alkylene oxides which are employed are, preferably, ethylene oxide, propylene oxide, butylene oxide and mixtures thereof. The construction of the polyether chains by alkoxylation can be carried out with only one monomeric epoxide, or it can take place randomly or also in block form with two or three different monomeric epoxides.

Processes for the preparation of such polyether-polyols are described in "Kunststoffhandbuch, volume 7, Polyurethane, in "Reaction Polymers" and e.g. in U.S. Pat. No. 1,922,451, U.S. Pat. No. 2,674,619, U.S. Pat. No. 1,922,459, U.S. Pat. No. 3,190,927 and U.S. Pat. No. 3,346,557.

Methods for the preparation of polyester-polyols are also well-known and are described e.g. in the two abovementioned literature references ("Kunststoffhandbuch, volume 7, Polyurethane", "Reaction Polymers"). The polyester-polyols are in general prepared by polycondensation of polyfunctional carboxylic acids or derivatives thereof, such as e.g. acid chlorides or anhydrides, with polyfunctional hydroxyl compounds.

Polyfunctional carboxylic acids which can be used are, for example: adipic acid, phthalic acid, isophthalic acid, terephthalic acid, oxalic acid, succinic acid, glutaric acid, azelaic acid, sebacic acid, fumaric acid or maleic acid.

Polyfunctional hydroxyl compounds which can be used are, for example: ethylene glycol, diethylene glycol, triethylene glycol, 1,2-propylene glycol, dipropylene glycol, 1,3-butanediol, 1,4-butanediol, 1,6-hexanediol, 1,12-dodecanediol, neopentylglycol, trimethylolpropane, triethylolpropane or glycerol.

The preparation of the polyester-polyols can furthermore also be carried out by ring-opening polymerization of lactones (e.g. caprolactone) with diols and/or triols as starter compounds.

The polyol mixtures according to the invention preferably comprise 30 to 70 wt. %, preferably 40 to 60 wt. % of a polyol with a viscosity of less than 3,000 mPas (25° C.), preferably less than 2,000 mPas (25° C.), based on the total amount of addition product(s) of alkylene oxide on aromatic di- or polyamine.

In another preferred embodiment, the polyol mixtures according to the invention comprise up to 20 wt. %, preferably up to 10 wt. %, based on the total amount of the polyol mixture, of a phthalic acid, terephthalic acid or adipic acid ester with an OH number of 200 to 400, preferably 250 to 300.

From experience, such polyesters, have a very favourable influence on the thermal conductivity, but on the other hand, curing of the foam is as a rule delayed by their addition. Due to the high reserves which the polyol mixtures according to the invention have in respect of curing, such concentrations of aromatic esters can be co-used without the mould dwell time of the foams being adversely influenced.

In another preferred embodiment, the polyol mixtures according to the invention comprise up to 20 wt. %, preferably up to 10 wt. %, based on the total amount of polyol mixture, of a polypropylene glycol with an OH number of 100 to 300.

Ethylene oxide (EO), propylene oxide (PO), butylene oxide, dodecyl oxide or styrene oxide, for example, can be employed as alkylene oxide for the preparation of the addition compounds; propylene oxide is preferably used.

Starter compounds which are employed for the preparation of the addition compounds are aromatic di- or polyamines which contain primary or secondary amino groups, e.g. phenylenediamines, toluylenediamines (2,3-toluylenediamine, 3,4-toluylenediamine, 2,4-toluylenediamine, 2,5-toluylenediamine, 2,6-toluylenediamine or mixtures of the isomers mentioned), diaminodiphenylmethanes (2,2'-diaminodiphenylmethane, 2,4'-diaminodiphenylmethane, 4,4'-diaminodiphenylmethane or mixtures of these isomers) and higher homologues thereof or naphthalenediamines, such as 1,8-naphthalenediamine. o-Toluylenediamine (mixture of 2,3-toluylenediamine and 3,4-toluylenediamine), diphenylmethanediamine or higher homologues thereof and 1,8-naphthalenediamine are preferred.

For the preparation of the polyol mixtures according to the invention, the low-viscosity polyol can be initially introduced into the reaction vessel, the amine can be added and the mixture can then be reacted with the alkylene oxide. The low-viscosity polyol can also be added directly after the reaction in the vessel, or the addition compound in the still warm state is brought together with the polyol having an OH number in the ranige from 250 to 500 via a mixing station during the transferring operation.

The invention also provides rigid polyurethane foams which are obtainable by reaction of a polyol mixture according to the invention with di- and/or polyisocyanates, blowing agents and optionally foam stabilizers, activators and other foam additives.

Possible di- or polyisocyanates are aliphatic, cycloaliphatic, araliphatic, aromatic and heterocyclic polyisocyanates such as are described in Justus Liebigs Annalen der Chemie 562 (1949) 75, for example those of the formula

in which n denotes an integer from 2 to 4, preferably 2, and

Q denotes an aliphatic hydrocarbon radical having 2 to 18, preferably 6 to 10 C atoms, a cycloaliphatic hydrocarbon radical having 4 to 15, preferably 5 to 10 C atoms, an aromatic hydrocarbon radical having 6 to 15, preferably 6 to 13 C atoms, or an araliphatic hydrocarbon radical having 8 to 15, preferably 8 to 13 C atoms.

Polyisocyanates such as are described in DE-OS 2 832 253 are preferred. The polyisocyanates which are easily accessible industrially are as a rule particularly preferably employed, e.g. 2,4- and 2,6-toluylene-diisocyanate and any desired mixtures of these isomers ("TDI"), polyphenyl-polymethylene-polyisocyanates, such as are prepared by aniline-formaldehyde condensation and subsequent phosgenation ("crude MDI") and polyisocyanates containing carbodiimide groups, urethane groups, allophanate groups, isocyanurate groups, urea groups or biuret groups ("modified polyisocyanates"), in particular those modified polyisocyanates which are derived from 2,4- and/or 2,6-toluylene-diisocyanate or from 4,4'- and/or 2,4'-diphenylmethane-diisocyanate.

Examples of blowing agents which can be employed according to the invention are water, alkanes, such as n-pentane, iso-pentane, mixtures of n- and iso-pentane, cyclopentane, cyclohexane and mixtures of butane isomers and the alkanes mentioned, dialkyl ethers, such as dimethyl ether or methyl butyl ether, cycloalkylene ethers, such as furan, partly halogenated fluorochlorohydrocarbons, such as 1,1,1-dichlorofluoroethane (R 141b), partly fluorinated hydrocarbons, such as tetrafluoroethane (R 134 or R 134a), 1,1,1,3,3,3-hexafluoropropane (R 356) or 1,1,1,3,3-pentafluoropropane (R 245fa), and sulfur hexafluoride. Further examples of blowing agents and details regarding the use of blowing agents are described in Vieweg and Höchtlen (ed.): Kunststoff-Handbuch, volume VII, Carl-Hanser-Verlag, Munich 1966, p. 108 et seq., p. 453 et seq. and p. 507 et seq.

Foam stabilizers which are employed are, above all, polyether-siloxanes, specifically water-soluble representatives. These compounds are in general constructed such that a copolymer of ethylene oxide and propylene oxide is bonded to a polydimethylsiloxane radical. Such foam stabilizers are described e.g. in U.S. Pat. No. 2,834,748, U.S. Pat. No. 2,917,480 and U.S. Pat. No. 3,629,308. Polysiloxane-polyoxyalkylene copolymers branched several times via allophanate groups, according to DE-A 25 58 523, are of particular interest.

Examples of suitable catalysts are organic tin compounds, such as tin(II) salts of organic carboxylic acids, e.g. tin(II) acetate, tin(II) octoate, tin(II) ethylhexoate and tin(II) laurate, and the dialkyltin(IV) salts, e.g. dibutyltin diacetate, dibutyltin dilaurate, dibutyltin maleate and dioctyltin diacetate. Further examples of suitable catalysts are triethylenediamine, N,N-dimethylcyclohexylamine, tetramethylenediamine, 1-methyl-4-dimethylaminoethylpiperazine, triethylamine, tributylamine, dimethylbenzylamine, N,N',N"-tris-(dimethylaminopropyl)hexahydrotriazine, dimethylaminopropylformamide, N,N,N',N'-tetramethylethylenediamine, N,N,N',N'-tetramethylbutanediamine, tetramethylhexanediamine, pentamethyldiethylene-triamine, tetramethyldiaminoethyl ether, dimethylpiperazine, 1,2-dimethylimidazole, 1-azabicyclo[3,3,0]octane, bis-(dimethylaminopropyl)-urea, N-methylmorpholine, N-ethylmorpholine, N-cyclohexylmorpholine, 2,3-dimethyl-3,4,5,6-tetrahydropyrimidine, triethanolamine, diethanolamine, triisopropanolamine, N-methyldiethanolamine, N-ethyldiethanolamine, dimethylethanolamine, tris-(N,N-dimethylaminopropyl)-s-hexahydrotriazine, tetramethylammonium hydroxide, potassium acetate, sodium acetate, sodium hydroxide or mixtures of these or similar catalysts.

Further examples of surface-active additives and foam stabilizers as well cell regulators, reaction retardants, stabilizers, flame-retardant substances, plasticizers, dye-stuffs and fillers and also fungistatically and bacteriostatically active substances which are optionally to be co-used and details regarding the mode of use and action of these additives are described in Vieweg and Höchtlen (ed.): Kunststoff-Handbuch, volume VII, Carl-Hanser-Verlag, Munich 1966, p. 103–113.

To prepare rigid polyurethane foams, the reaction components are reacted by the one-stage process which is known per se, the prepolymer process or the semi-prepolymer process, mechanical equipment such as is described in U.S. Pat. No. 2,764,565 preferably being used. Details on processing equipment which can be employed for this process are described in Vieweg and Höchtlen (ed.): Kunststoff-Handbuch, volume VII, Carl-Hanser-Verlag, Munich 1966, p. 121–205.

In the preparation of the foam, according to the invention foaming can also be carried out in closed moulds. The reaction mixture is introduced here into a mould. Metal, e.g. aluminium, or plastic, e.g. epoxy resin, is possible as the mould material. The foamable reaction mixture foams in the mould and forms the shaped article. Mould foaming can be carried out here such that the moulding has a cell structure on its surface. However, it can also be carried out such that the moulding has a compact skin and a cellular core. According to the invention, the procedure in this connection can be such that foamable reaction mixture is introduced into the mould in an amount such that the foam formed just fills the mould. However, a procedure can also be followed in which more foamable reaction mixture than is necessary to fill the inside of the mould with foam is introduced into the mould. In the latter case, the procedure is thus carried out with so-called "overcharging"; such a procedure is known e.g. from U.S. Pat. No. 3,178,490 and U.S. Pat. No. 3,182,104.

In mould foaming, "external release agents" which are known per se, such as silicone oils, are often co-used. However, so-called "internal release agents" can also be used, optionally as a mixture with external release agents, as can be seen, for example, from DE-OS 21 21 670 and DE-OS 23 07 589.

However, foams can of course also be prepared by block foaming or by the double conveyor belt process which is known per se (see "Kunststoffhandbuch", volume VII, Carl Hanser Verlag, Munich Vienna, 3rd edition 1993, p. 148).

The invention also relates to the use of the rigid foams according to the invention for thermal insulation. The foams according to the invention can advantageously be employed in all applications of thermal insulation. Use as an insulating material in refrigeration apparatuses is preferred according to the invention, since the combination of good thermal insulation, high strength, good pentane solubility (blowing agent) and rapid curing (short mould dwell time) is particularly appropriate here. The rigid foams according to the invention can be used, for example, as an intermediate layer in composite elements or for filling hollow spaces of refrigerators and freezers with foam. However, they are also used in the construction industry or for thermal insulation of long-distance heating pipes and containers.

EXAMPLES

Polyol A 9 kg of an isomer mixture of 2,3- and 3,4-toluylenediamine are initially introduced into a 100 l reactor suitable for reactions with alkylene oxides and, after flushing thoroughly with nitrogen, 15 kg propylene oxide (3.5 mol/mol of toluylenediamine) are metered in at 110 to 125° C. under 2 to 3 bar of nitrogen in the course of 2 hours. After an after-reaction of 2 hours, the reaction mixture is cooled. 24 kg of a polyether of OH number 605 are obtained.

Polyol B

A polyether obtained by anionic polyaddition of 1,2-propylene oxide on to a mixture of sucrose, ethylene glycol and water and with a number-average molecular weight of 550 g/mol and an OH number of 440.

Polyol C

A polyether obtained by anionic polyaddition of 1,2-propylene oxide on to a mixture of sucrose, ethylene glycol and water and with a number-average molecular weight of 350 g/mol and an OH number of 380.

Polyol D

Polyester-polyol with a number-average molecular weight of 380 g/mol and an OH number of 300, obtained by polycondensation of phthalic anhydride with diethylene glycol.

Foam Preparation

A mixture of polyethers A, B, C and D in a weight ratio of 30:40:20:10 is prepared. This mixture is processed in accordance with table 1 on a high-pressure machine HK 270 from Hennecke at 20° C. to give rigid polyurethane foam. The mechanical parameters measured on this foam are summarized in table 2.

TABLE 1

| | |
|---|---|
| Polyol mixture [pt. by wt.] | 100 |
| Silicone stabilizer [pt. by wt.] | 2 |
| Catalyst 1 [pt. by wt.] | 1 |
| Catalyst 2 [pt. by wt.] | 0.5 |
| Water [pt. by wt.] | 2 |
| Cyclopentane [pt. by wt.] | 17 |
| Isocyanate [pt. by wt.] | 156 |

Catalyst 1: Dimethylcyclohexylamine
Catalyst 2: Pentamethyldiethylenetriamine
Silicone stabilizer: Commercially available silicone stabilizer (Tegostab ® B 8443, Th. Goldschmidt AG, D-Essen)
Isocyanate: Polymeric MDI (Desmodur ® 44V20, Bayer AG, D-51368 Leverkusen)

TABLE 2

| | |
|---|---|
| Free bulk density [kg/m$^3$] | 21.4 |
| Core bulk density [kg/m$^3$] | 32.0 |
| Thermal conductivity according to DIN 52616-77 (mW/m · K) | 19.8 |
| Compressive strength according to DIN 52421-84 (MPa) | 0.14 |
| Dimensional stability according to DIN 53431-77 (3 h, −30° C.); change in dimensions in % | 0 |

What is claimed is:

1. A polyol mixture comprising
    a) 5–60 wt. %, based on total weight of a)+b), of an alkylene oxide on an aromatic diamine or polyamine addition product having a molar ratio of alkylene oxide to hydrogen atoms bonded to nitrogen of the diamine or polyamine no greater than 1:1 and
    b) 40–95 wt. %, based on total weight of a)+b), of a polyether polyol and/or polyester polyol having an OH number of from 250–500.

2. The polyol mixture of claim 1 in which 30–70 wt. %, based on total weight of a), of a polyol having a viscosity of less than 3,000 mPas at 25° C. is included.

3. The polyol mixture of claim 2 in which up to 20 wt. %, based on total weight of the polyol mixture, of an ester of phthalic acid, terephthalic acid or adipic acid having an OH number of from 200 to 400 is included.

4. The polyol mixture of claim 1 in which up to 20 wt. %, based on total weight of the polyol mixture, of an ester of phthalic acid, terephthalic acid or adipic acid having an OH number of from 200 to 400 is included.

5. The polyol mixture of claim 3 in which up to 20 wt. %, based on total weight of the polyol mixture, of a polypropylene glycol having an OH number of from 100 to 300 is included.

6. The polyol mixture of claim 1 in which up to 20 wt. %, based on total weight of the polyol mixture, of a polypropylene glycol having an OH number of from 100 to 300 is included.

7. The polyol mixture of claim 5 in which the alkylene oxide is propylene oxide.

8. The polyol mixture of claim 1 in which the alkylene oxide is propylene oxide.

9. The polyol mixture of claim 8 in which the aromatic diamine or polyamine is o-toluylenediamine.

10. The polyol mixture of claim 1 in which the aromatic diamine or polyamine is o-toluylenediamine.

11. The polyol mixture of claim 8 in which the aromatic diamine or polyamine is a diphenylmethanediamine.

12. The polyol mixture of claim 1 in which the aromatic diamine or polyamine is a diphenylmethanediamine.

13. The polyol mixture of claim 8 in which the aromatic diamine or is 1,8-naphthalenediamine.

14. The polyol mixture of claim 1 in which the aromatic diamine or is 1,8-naphthalenediamine.

15. A rigid polyurethane foam produced by reacting the polyol mixture of claim 1 with a diisocyanate or a polyisocyanate in the presence of a blowing agent.

16. A process for the production of a thermal insulating material reacting the polyol mixture of claim 1 with a diisocyanate or a nate in the presence of a blowing agent.

* * * * *